(12) United States Patent
Schuster et al.

(10) Patent No.: US 11,660,593 B2
(45) Date of Patent: May 30, 2023

(54) FLUID ASSEMBLY

(71) Applicant: Festo SE & Co. KG, Esslingen (DE)

(72) Inventors: Tobias Schuster, Reutlingen (DE); Jens Engelhardt, Esslingen (DE); Maik Flach, Waiblingen (DE); Duc-Thang Vu, Esslingen (DE); Gabor Duroska, Stuttgart (DE); Stefan Bammesberger, Stuttgart (DE)

(73) Assignee: Festo SE & Co. KG, Esslingen (DE)

( * ) Notice: Subject to any disclaimer, the term of this patent is extended or adjusted under 35 U.S.C. 154(b) by 281 days.

(21) Appl. No.: 16/950,384

(22) Filed: Nov. 17, 2020

(65) Prior Publication Data

US 2021/0148267 A1 May 20, 2021

(30) Foreign Application Priority Data

Nov. 18, 2019 (DE) .......................... 102019217743.3

(51) Int. Cl.
*B01L 3/02* (2006.01)
*F01N 3/20* (2006.01)
*F15B 13/08* (2006.01)
*F16K 31/04* (2006.01)

(52) U.S. Cl.
CPC ........... *B01L 3/0237* (2013.01); *B01L 3/0293* (2013.01); *F01N 3/208* (2013.01); *F15B 13/086* (2013.01); *F16K 31/046* (2013.01)

(58) Field of Classification Search
CPC ................................................ F16K 31/046
See application file for complete search history.

(56) References Cited

U.S. PATENT DOCUMENTS 5,737,979 A * 4/1998 McKenzie ............ F16H 61/061
74/731.1

FOREIGN PATENT DOCUMENTS

| DE | 19739215 A1 | 3/1998 |
| DE | 102010013695 A1 | 10/2011 |
| EP | 3071842 A1 | 9/2016 |

* cited by examiner

*Primary Examiner* — Eric Keasel
(74) *Attorney, Agent, or Firm* — Hoffmann & Baron, LLP

(57) ABSTRACT

Fluid assembly for use in a fluid system, having a control module including a processing unit for processing control commands into individual electrical control signals with individually adjustable control signal levels and a control signal level electrically connected to the processing unit, with a power unit, which has a power module for converting the control signals into individual electrical control currents as a function of the control signal levels and an output interface electrically connected to the power module, wherein the processing unit is designed to provide a first group of control signals in a first time interval which can be individually predetermined for each control signal and to provide a second group of control signals in a second time interval which can be individually predetermined for each control signal and follows the respective first time interval, wherein the first control signal and the second control signal are selected in such a way that the control currents in the first time interval are greater than the control currents in the second time interval.

10 Claims, 2 Drawing Sheets

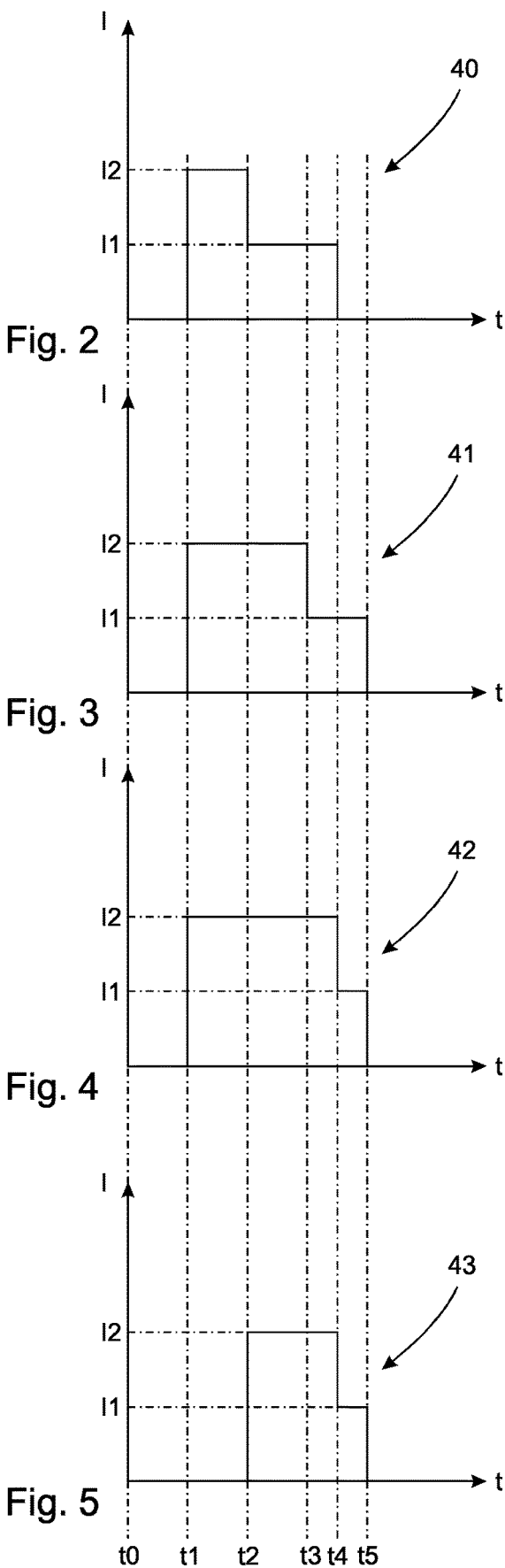

FLUID ASSEMBLY

BACKGROUND OF THE INVENTION

The invention relates to a fluid assembly for use in a fluid system.

Such a fluid assembly may, for example, be a dosing head for a liquid dosing system, in particular for a pipetting system, as used in the field of laboratory technology. Such a dosing head is connected, for example, to a compressed air source and to an electrical supply and, if necessary, to a liquid source, thus forming a fluid system. In this case, the compressed air provided by the compressed air source can be used for the temporary intake and/or dispensing of predeterminable quantities of liquid with the aid of the fluid assembly, which can be equipped in particular with several valves for influencing air flows of compressed air. As an example, it may be provided that several pipettes, which can be individually pressurized with vacuum and/or overpressure via assigned valves, are attached to the fluid assembly, which is designed as dispensing head. A liquid can be added to one of the pipettes by individually applying negative pressure to the respective pipette. An individual supply of liquid from pipette is achieved by individually pressurizing the respective pipette with positive pressure.

SUMMARY OF THE INVENTION

The task of the invention is to provide a fluid assembly which has a simplified structure.

This task is solved for a fluid assembly of the type mentioned above with the following features:

It is provided that the fluid assembly has a control module, which comprises an input interface for receiving control commands, a processing unit which is electrically connected to the input interface for processing the control commands into individual electrical control signals with individually adjustable control signal levels and a signal interface electrically connected to the processing unit for outputting the control signals. Furthermore, the fluid assembly includes a power unit which comprises a control interface electrically connected to the signal interface for receiving the control signals, a power module electrically connected to the control interface for converting the control signals into individual electrical control currents depending on the control signal levels, a supply interface electrically connected to the power module for feeding electrical energy into the power module and an output interface electrically connected to the power module, which is designed to provide the control currents for individual electrical supply of several electrical consumers, which may be solenoid valves. Furthermore, it is provided that the processing unit is designed for providing a first group of control signals from a first level interval in a first time interval, which first time interval can be individually predetermined for each control signal and for providing a second group of control signals from a second level interval in a second time interval, which second time interval can be individually predetermined for each control signal, wherein a first interval limit of the first level interval and a second interval limit of the second level interval are selected such that the control currents in the first time interval are greater than the control currents in the second time interval.

The control module thus serves to convert control commands, which are provided at the input interface, for example, via a cable connection or via a wireless connection from a higher-level control system, into individual electrical control signals with time-dependent, individually adjustable control signal levels. The control commands are converted in the processing device, which can be designed as a microcontroller or a microprocessor and in which, for example, a computer program for processing the incoming control commands is executed. The respective incoming control command is converted in a way which can be predetermined by the computer program into individual electrical control signals for the individual electrical consumers, whereby the control signals for the individual consumers can differ from each other by their respective control signal levels, in particular by different electrical voltages, but do not necessarily have to differ. For each individual control signal it is provided that a control signal level of the control signal is changed after the expiration of an individually predefinable first time interval and has a control signal level during an individually predefinable second time interval which is different from the control signal level during the first time interval. The control signals are output at the signal interface of the control module and provided to a control interface of the power unit.

Preferably, it is intended that the control signals are provided by the processing unit in the form of electrical low-voltage signals, in particular in a voltage range between 0 volts and 10 volts, preferably between 0 volts and 5 volts. The control signals are preferably unamplified output signals provided directly by the microcontroller or microprocessor of the processing unit.

The control signals are provided to the power unit, in which the control signals are converted into control currents, which are adapted to electrical consumers that can be connected to the output interface of the power unit. In order to be able to carry out this conversion, the power unit comprises, in addition to the control interface, a supply interface to which electrical energy can be supplied which is provided to a power module together with the control signals.

The power module can, in particular, be an arrangement of several electrical output stages, each of these electrical output stages being supplied with one of the individual electrical control signals and being able to be supplied with the electrical energy provided at the supply interface in order to be able to provide the required control current for the assigned electrical consumer, in particular a solenoid valve.

Purely exemplary, the electrical consumers are solenoid valves, especially 2/2-way valves, which can be transferred from a first, preferably closed, functional position to a second, preferably open, functional position by providing a control current.

For this purpose the power module is connected to the output interface, which preferably comprises a number of electrical contacts corresponding to the number of electrical consumers connected to it, in particular solenoid valves. This allows an individual electrical control current to be provided for each of the electrical consumers connected to the output interface.

In order to ensure a simple design for the fluid assembly, it is thus intended that only in the processing unit an individual adaptation of the control signals to the requirements of the connected consumers, in particular solenoid valves, is carried out.

On the other hand, in the power unit, an exactly specifiable, in particular proportional, conversion of the incoming control signals into control currents takes place, so that no local intelligence in the form of a microcontroller or microprocessor is required here and simple and robust electrical or electronic circuits can be used to realize the desired conversion of the control signals into control currents.

In order to enable an advantageous control of electrical consumers which are connected to the output interface of the power unit, the processing unit is designed to output a first group of control signals. Here it may be provided that each of these control signals has an individual control signal level, which is arranged within a first level interval, and that the provision of the first group of control signals for each of the control signals may be effected in an individually specifiable first time interval. Furthermore, the processing unit is designed to output a second group of control signals, wherein each of these control signals can have a control signal level which is arranged within a second level interval and wherein each of these control signals is output within an individually predeterminable second time interval. Here it is always provided that an individual control signal for a load connected to the supply interface, in particular a solenoid valve, which belongs to the second group of control signals, is immediately followed in time by an individual control signal for the same electrical load from the first group of control signals. Preferably, it is intended that for each of the individual control signals a total switching time resulting from the addition of the first individual time interval and the second individual time interval is equal. Alternatively, it may be provided that this total switching time may be different for each of the individual control signals.

It is further provided that first interval limit of the first level interval and second interval limit of the second level interval are selected in such a way that the control currents in the first time interval are greater than the control currents in the second time interval. The objective here is a time sequence of a higher control current, with which, for example, a movement of a valve member of a solenoid valve can be effected, and a subsequent holding phase for the valve member of the solenoid valve, in which a lower control current is required. The resulting so-called holding current reduction serves in particular to reduce energy consumption and to reduce heat generation in the fluid assembly, provided that it is equipped with solenoid valves as electrical consumers.

Advantageous further development of the invention is the subject of the subclaims.

It is useful if the first interval limit of the first level interval and the second interval limit of the second level interval are selected in such a way that the control currents caused by the first group of control signals are at least 200 percent, preferably at least 300 percent, preferably at least 400 percent, in particular at least 500 percent, greater than the control currents caused by the second group of control signals. Preferably it is provided that a lower interval limit of the first level interval represents a signal level which is at least 200 percent larger than an upper interval limit of the second level interval, i.e. at least twice as large. This ensures that the control currents caused by the control signals in power unit differ by at least 200 percent. This results in an advantageous reduction of the energy supply to the electrical consumers connected to the supply interface of power unit, in particular solenoid valves, during the respective second time interval.

It is advantageous if the first level interval comprises exactly one level value for the control signal and/or if the second level interval comprises exactly one level value for the control signal. This simplifies the handling of the level values in the processing unit of the control module.

In the case of an advantageous further embodiment of the invention, it is provided that several solenoid valves, in particular of the same design, are connected to the output interface and that the power unit is designed to provide individual electrical control currents for each of the solenoid valves. The solenoid valves can be used, for example, to influence a compressed air flow or a liquid flow in order to enable the dosing of liquids for laboratory purposes, for example. Preferably, it is intended that the power unit for each of the solenoid valves can provide a control current for each of the solenoid valves which is variable over time and adjustable in terms of its magnitude. This enables an individual control of the solenoid valves according to the technical design of the respective solenoid valve. It is particularly preferred that the solenoid valves connected to the output interface are all designed in the same way, whereby an individual provision of electrical control currents can also be advantageous here in order to be able to adapt to different states of wear and/or manufacturing tolerances of the solenoid valves on the one hand and to be able to switch the solenoid valves individually between an open state and a closed state on the other hand.

These measures ensure that the fluid flows provided by the respective solenoid valves are identical regardless of different wear conditions of solenoid valves. Alternatively, it can be achieved that each of the solenoid valves or at least some of the solenoid valves provide different fluid flows that can be precisely specified. For the fluid flow provided by the respective solenoid valve, both the total duration of the provision of a control current and the provision of the control current as actuating current during the first time interval and as holding current during the second time interval play a significant role.

In further embodiment of the invention it is provided that, in particular exactly one, solenoid coil is arranged in a current path of the solenoid valve which extends between a first terminal contact and a second terminal contact. Thus, solenoid valve does not have its own electronics or even intelligence, rather it is intended that solenoid valve is designed as simple as possible from an electrical point of view and preferably comprises only one solenoid coil. All settings required for the proper operation of solenoid valve, which result in corresponding control currents for solenoid valve, are specified by the processing unit of control module.

Preferably, it is provided that the control module has a parameter interface which is electrically connected to the processing unit for receiving parameterization commands. The processing unit is designed to adapt the individual electrical control signals depending on the parameterization commands. Accordingly, an adaptation of the electrical control signals for the control of the electrical loads which can be connected to the output interface of the power unit can be carried out by using a suitable parameter device like a handheld computer which, in particular, can enter into communication with the parameter interface either wirelessly or by cable. For example, the parameter device can be a standard computer, especially in the form of a laptop or tablet computer, which is connected to the parameter interface by cable and on which software can be operated, which can also be called graphical user interface. With the parameter device, a user can intuitively set the desired parameters for the processing unit, in particular by specifying the type of electrical consumer connected to the output interface, in particular the solenoid valve. This parameterization can include, for example, a specification of an amount of the first control signal level and a duration of the first time interval as well as an amount of the second control signal level and a duration of the second time interval. As an example, it is intended that the software running on the parameter device generates suitable information from the user inputs, on the basis of which the desired adaptation of the individual electrical control signals can be carried out in the processing unit.

It is expedient if the processing unit is designed in such a way that for each of the individual electrical control signals the first time interval and the second section can be determined individually by means of the parameterization commands. In this way, the individual characteristics of the electrical consumer connected to the output interface of the power unit, in particular of the solenoid valve, can be taken into account. For example, a new solenoid valve, which does not yet show any signs of wear, can be provided with a first control signal level in a short first time interval and the second time interval in which the second control signal level is provided can be selected longer. In contrast, the first control signal level can be provided during a longer first time interval in order to take into account the wear of solenoid valve and the resulting longer reaction time. Accordingly, the second time interval is also adjusted, in particular reduced, accordingly. As an example, it is intended that the sum of the respective first time intervals and the respective second time intervals is the same for all electrical consumers. This means that electrical consumers designed as solenoid valves, for example, can be used to provide the same amount of fluid. Alternatively, each of the connected solenoid valves can be used to provide a different fluid flow, for example, to be able to provide different fluid quantities and/or types of fluid with the different solenoid valves. In this case, the sums of the respective first time intervals and the respective second time intervals may be different for the respective electrical consumers/solenoid valves.

It is advantageous if the processing unit is designed in such a way that a first control signal level from the first level interval and/or a second control signal level from the second level interval can be selected for each of the individual electrical control signals by means of the parameterization commands. This possibility of parameterizing the individual control signals in the processing unit is of particular interest if different loads are connected to the output interface of the power unit, which loads must be supplied with different control currents for proper use, which is done in the fluid assembly by specifying the corresponding control signal levels. The different consumers can either be technologically different like solenoid valves and electric motors, or they can be identical and may have different states of wear, wherein the individual first and/or second control signal levels can be used to at least partially compensate for any differences in movement resistance for a valve member or the like. As an example, it can be planned to select control signals and the resulting control currents for new solenoid valves, which are below a predefined maximum current for the solenoid valve, since it is assumed that solenoid valve nevertheless switches sufficiently fast. On the other hand, it can be planned to provide a control signal and a resulting control current for a solenoid valve with advanced wear which lies within the range of the maximum current of solenoid valve.

Preferably, it is intended that the input interface is designed to receive control commands coded digitally as bus telegrams and/or to receive analog control commands coded in particular by a current level or a voltage level. Accordingly, if the input interface is appropriately designed, the fluid assembly can be directly connected to a bus system, in particular a proprietary bus system or a standard bus system, in order to receive bus telegrams containing digitally coded control commands. In addition or alternatively, the input interface can be designed to receive analog control commands, which are provided, for example, by a machine controller of a fluid system in which the fluid assembly is integrated. These analog control commands can be current signals or voltage signals, for example. As an example, it may be provided that the analog control command is only provided as a short pulse, i.e., it contains only a short deviation from an otherwise permanently existing current level or voltage level, whereby the provision of the intended electrical control signals is triggered in the processing unit. In this case, the time interval during which control currents are output can be stored in the processing unit, especially in the form of individual parameterizations for the individual electrical consumers. Alternatively, it can be provided that the analog control command is provided as a longer lasting change of a current level or voltage level, whereby in this case a period of time during which a changed current level or voltage level is provided also means a period of time for the corresponding control of the electrical consumers connected to the output interface of the power unit. In this case, an individual parameterization for the first and the second time interval for the individual electrical consumer can be stored in the processing unit.

Preferably, it is intended that the control module and the power unit are arranged on a common printed circuit board, the printed circuit board being arranged in a housing to which a holder is fixed on which several solenoid valves, which are electrically connected to the output interface, are arranged, in particular in a closed row along a row axis. This enables a compact design of the fluid system, which is used, for example, as dosing head of a dosing system.

BRIEF DESCRIPTION OF THE DRAWINGS

In the following, the invention is explained in more detail using the enclosed drawing.

FIG. 2 is a schematic representation of a first control current curve, FIG. 3 is a schematic representation of a second control current curve, FIG. 4 a schematic representation of a third control current curve, and FIG. 5 is a schematic representation of a fourth control current curve.

DETAILED DESCRIPTION

Figure 1:
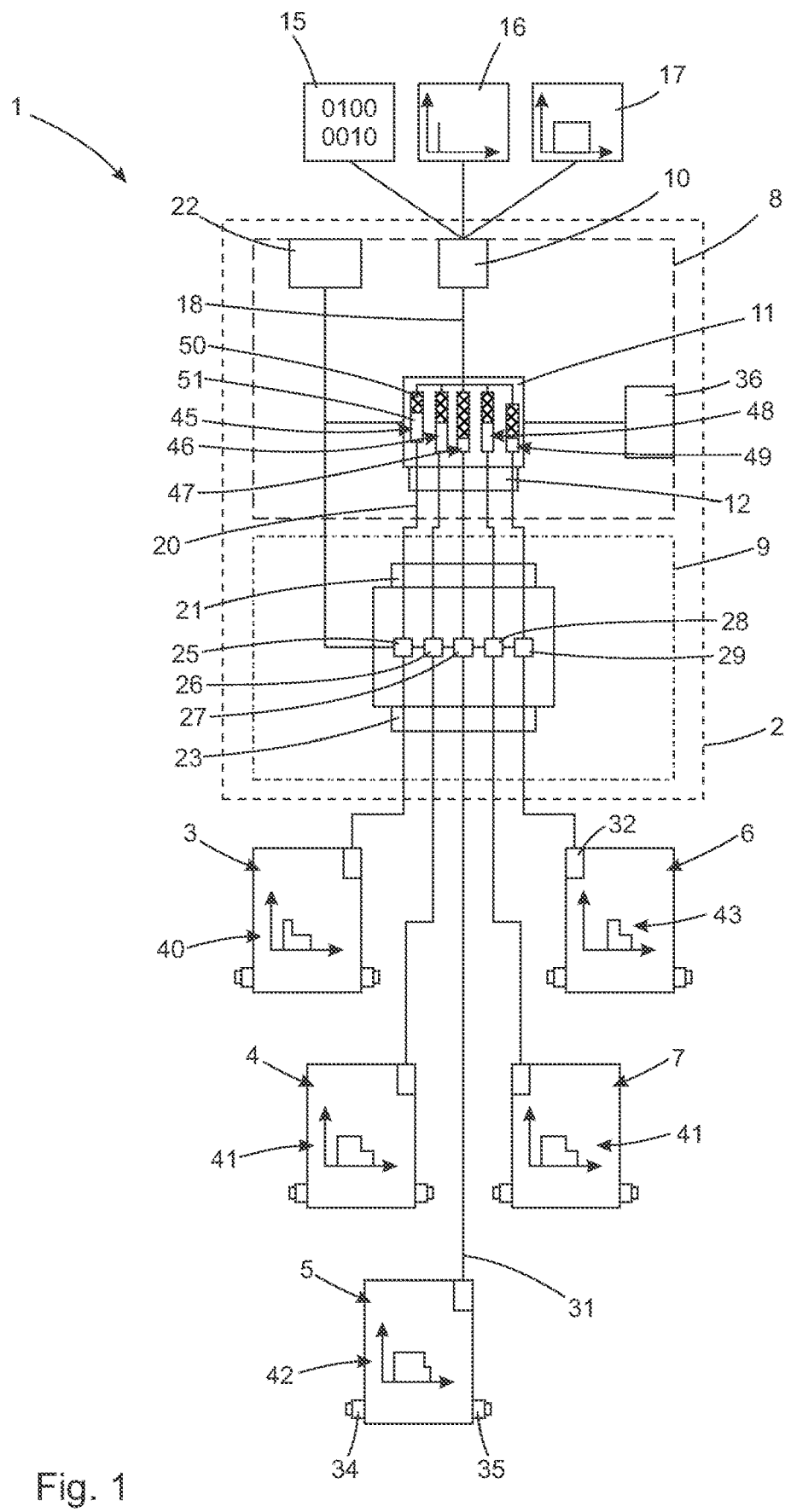
FIG. 1 is a strictly schematic representation of a fluid assembly for a dispensing head of a pipetting system.

A fluid assembly 1 shown in FIG. 1 purely schematically comprises a control module 2 and several solenoid valves 3 to 7 electrically connected to the control module 2. The fluid assembly 1 can be used, just as an example, in a dispensing head of a pipetting system, which is not shown in detail. The task of the fluid assembly 1 is to convert electrical control commands from an unspecified higher-level machine control system into fluid streams with which the desired dosing of fluids, especially liquids, can be performed.

The task of control module 2 is to convert incoming control commands into individual control currents for the respective consumers, in particular for the solenoid valves 3 to 7.

For this purpose, control module 2 comprises a control module 8 and a power unit 9, which are designed separately as shown in FIG. 1, but which may in practice also be arranged on a common, printed circuit board.

The control module 8 comprises an input interface 10, a processing unit 11 electrically connected to the input interface 10, and a signal interface 12 electrically connected to the processing unit 11.

The input interface 10 is designed for receiving control commands which can be provided, for example, by a higher-level machine control system, which is not shown. These control commands can be, for example, digitally coded control commands transmitted in a bus telegram 15. In addition or alternatively, the input interface 10 can also be designed for receiving analog control commands, for example in the form of voltage signals or current signals. As a pure example, the input interface 10 can receive pulse-shaped analog control commands 16 as well as analog control commands with continuous level change 17 and transmit them to the processing unit 11 via a signal line 18.

The processing unit 11 can be designed as a microcontroller or microprocessor and serves to process the incoming control commands into control signals. These control signals, which are preferably analog voltage signals that can assume signal levels in a value interval between 0 Volt and 10 Volt, are provided to a signal interface 12. For example, the processing unit 11 is designed to provide five control signals, which are provided at the signal interface 12 in such a way that each of the five individual control signals can be transmitted to the power unit via an individual control signal line 20.

For the electrical coupling with the processing unit 11, the power unit 9 comprises a control interface 21 to which the five control signal lines 20 are connected. The power unit 9 provides several electrical output stages 25, 26, 27, 28, 29, which may, for example, be power transistors which can be individually controlled by means of the individual control signals transmitted via the control signal lines 20. The output stages 25, 26, 27, 28, 29 are electrically connected to a supply interface 22 in addition to an electrical connection to the respective individual control signal line 20. The supply interface 22 is used to provide electrical energy to the power unit 9, whereby the output stages 25, 26, 27, 28, 29 are designed in such a way that they can cause a control current to be provided at an output interface 23 depending on an individual electrical control signal provided via the respective control signal line 20. A proportional relationship between the respective individual control signal level and the resulting individual control current is preferred.

The five solenoid valves 3 to 7 of the same type are connected to the output interface 23. Each of the solenoid valves 3 to 7 has a connector plug 32 which is connected to the output interface 23 via an individual connection line 31. This enables a separate control of each of the solenoid valves 3 to 7 independently of the other solenoid valves 3 to 7.

As an example, each of the solenoid valves 3 to 7 exclusively contains a solenoid coil which is not shown in detail and which is electrically connected to a first connecting contact which is not shown and to a second connecting contact which is also not shown. The connecting contacts which are not shown are connected to the connecting line 31. Preferably, solenoid valve 3 to 7 does not include any additional electrical or electronic components and thus reacts in a precisely predictable manner to the actuation current provided at output interface 23 of power unit 9.

Due to production-related tolerances of solenoid valves 3 to 7 and/or due to wear and tear in solenoid valves 3 to 7, different behaviour of solenoid valves 3 to 7 may occur. As an example, solenoid valves 3 to 7 are provided for the optional blocking or enabling of a fluid channel extending between an inlet port 34 and an outlet port 35 through the respective solenoid valve 3 to 7. Thus, deviations in the behaviour of the individual solenoid valves 3 to 7 lead to differences in the fluid quantity provided by the respective solenoid valve 3 to 7. These deviations can be compensated by parameterizing the individual first control signals, in particular by the individual duration of the respective first time interval, and by parameterizing the individual second control signals, in particular by the individual duration of the respective second time interval.

It is provided that for the solenoid valves 3 to 7 a continuous supply of coil currents is required after a change-over from a first functional state, for example a closed state, to a second functional state, for example an open state. It is advantageous to reduce the coil current after the second functional state has been reached, since the energy requirement of solenoid valve 3 to 7 for maintaining the second functional state is lower than for switching over between the first and second functional states and undesired heating of the respective solenoid valve 3 to 7 should be avoided.

For example, four different switching characteristics 40, 41, 42, 43, also known as control current characteristics, are assigned to solenoid valves 3 to 7 by corresponding parameterization of processing unit 11. These switching characteristics 40, 41, 42, 43, which can preferably be freely parameterized for each solenoid valve 3 to 7 and which are described in more detail in connection with FIGS. 2 to 5 below, are symbolized by the respective bar diagrams 45 to 49.

As an example, the bar diagram 45 shows a first bar section 50 and a second bar section 51. The first bar section 50 symbolizes the first time interval, which can be set by parameterization, in which the processing unit 11 provides a first control signal. The second bar section 51 symbolizes the second time interval, which can be set by parameterization, in which the processing unit 11 provides a second control signal.

FIGS. 2 to 5 show diagrams with switching characteristics 40, 41, 42 and 43, where a current flow I [ampere] is shown over the time t [seconds]. The respective switching characteristics 40, 41, 42 and 43 are influenced by the parameterization of the processing unit 11, which is represented by the bar graphs 45 to 49 described above.

In the case of switching characteristic 40 as shown in FIG. 2, it is intended that, starting from a disappearing coil current in the time span between the points in time t0 and t1 from point in time t1 to point in time t2, a coil current I2 is provided which, in the respectively assigned solenoid valve, leads to a movement of a valve member between a first functional position and a second functional position. When maintaining the second functional position for the valve member the solenoid coil of solenoid valve 3 to 7, which is also not shown in detail, has a lower energy requirement compared to the switching movement, therefore the coil current is reduced to I1 starting with t2. The coil current I1 is maintained until the respective solenoid valve 3 to 7 is switched off at t4.

Accordingly, a first time interval is provided for the control of a solenoid valve 3 to 7 with switching characteristic 40 according to FIG. 2, which lasts from t1 to t2 and during which the control current I2 is provided. A second time interval is provided, which extends from t2 to t4 and which immediately follows the first time interval. During the second time interval the drive current is maintained at the level of I1. Subsequently, solenoid valve 3 to 7 is switched off due to the expiration of the total switching time provided as the sum of the first time interval and the second time interval and adjustable by parameterizing the two time intervals.

Deviating from this, the representation of the switching characteristic 41 as shown in FIG. 3 provides that the first control current I2 is maintained between time t1 and time t3, while the second control current is maintained from time t3 to time t5. Thus the switching characteristic according to FIG. 2 differs from the switching characteristic according to FIG. 1 not only in the length of the total switching time, but also in the length of time during which the higher control current I2 is provided within this total switching time.

In the case of switching characteristic 42 as shown in FIG. 4, the same total switching time for providing the control current is provided as in the case of switching characteristic 41 as shown in FIG. 3, but the time interval for providing the higher control current I2 is longer than in the case of switching characteristic 41.

In the representation of switching characteristic 43 as shown in FIG. 5, it is intended that the first control current I2 is provided at time t2 and is maintained until time t4, while the second control current is maintained from time t4 to time t5. Thus the switching characteristic according to FIG. 4 differs from the switching characteristic according to FIGS. 2 and 3 in the length of the total switching time and in the time at which the higher control current I2 is provided within this total switching time. Such a switching characteristic can be provided, for example, to limit a total current consumption for power unit 9. Furthermore, in the case of solenoid valves 3 to 7 switching at different speeds, this can be used to make an adjustment for the point in time at which the respective fluid quantity to be dosed is output by the respective solenoid valve 3 to 7.

The switching characteristics as shown in FIGS. 2 to 5 can each be specified by parameterizing the processing unit 11, whereby this parameterization can be carried out via the parameterization interface 36. Preferably, it is intended that during parameterization, the first time interval and the second time interval can be defined individually for each of the solenoid valves 3 to 7 and thus a resulting in individual total switching times for the respective solenoid valves 3 to 7. In addition, a switching time can also be defined after the arrival of an externally provided switching signal for each of the individual electrical control signals, in order, for example, to realize the switching delay described in connection with FIG. 5. A parameterization of the first time interval and the second time interval can, for example, be carried out in steps which are smaller by a factor of 50 to 1000 than the respective total switching time.

As an example, a parameterization device not shown in detail, e.g. a personal computer, on which parameterization software is executed, can be connected to parameterization interface 36.

By means of the parameterization software, it is possible, for example, by specifying a type designation for the respectively connected solenoid valve 3 to 7 using a corresponding database, to make a default setting for the parameters which determines the duration of the first and the second time interval and, if necessary, also the amount of the respective signal level in the time intervals.

Furthermore, user inputs can be made to influence the individual parameters, i.e. in particular the duration of the first and second time intervals and, if necessary, also the amount of the respective signal level in the time intervals, and thus to set the desired valve function as required. In addition, it can also be provided that the number of switching cycles for the respective solenoid valve 3 to 7 is stored in the processing unit 11 and, if necessary, an automatic adjustment of the first and second time intervals is carried out depending on an assumed wear behaviour of the respective solenoid valve 3 to 7.

What is claimed is:

1. A fluid assembly for use in a fluid system, the fluid assembly comprising a control system having a control module and a power unit,
    the control module comprising:
        an input interface for receiving control commands;
        a processing unit electrically connected to the input interface for processing the control commands into individual electrical control signals with individually adjustable control signal levels; and
        signal interface electrically connected to the processing unit for outputting the control signals, and
    the power unit comprising:
        a control interface electrically connected to the signal interface for receiving the control signals; and
        a plurality of electrical output stages connected to the control interface for converting the control signals into individual electrical control currents depending on the control signal levels,
    wherein the control system further comprises a supply interface electrically connected to the plurality of electrical output stages for feeding electrical energy into the plurality of electrical output stages, and
    wherein the power unit further comprises an output interface electrically connected to the plurality of electrical output stages, the output interface providing the control currents to provide an individual electrical supply to a plurality of electrical loads, and
    wherein the processing unit provides a first group of control signals from a first level interval in a first time interval which can be individually predetermined for each control signal, and
    wherein the processing unit further provides a second group of control signals from a second level interval in a second time interval which can be individually predetermined for each control signal, wherein the respective second time interval follows the first time interval and wherein first interval limit of the first level interval and second interval limit of the second level interval are selected such that the control currents in the first time interval are greater than the control currents in the second time interval.

2. The fluid assembly according to claim 1, wherein the first interval limit of the first level interval and the second interval limit of the second level interval are selected in such a way that the control currents effected by the first group of control signals are at least 200 percent greater than the control currents effected by the second group of control signals.

3. The fluid assembly according to claim 1, wherein the first level interval comprises exactly one level value for the control signal and/or that the second level interval comprises exactly one level value for the control signal.

4. The fluid assembly according to claim 1, wherein a plurality of solenoid valves are connected to the output interface, and wherein the power unit is designed to provide individual electrical control currents for each of the solenoid valves.

5. The fluid assembly according to claim 4, wherein a solenoid coil is arranged in a current path of the solenoid valve which extends between a first terminal contact and a second terminal contact.

6. The fluid assembly according to claim 1, wherein the control module has a parameter interface electrically connected to the processing unit for receiving parameterization commands, and wherein the processing unit is designed to adapt the individual electrical control signals as a function of the parameterization commands.

7. The fluid assembly according to claim 6, wherein the processing unit is designed in such a way that for each of the individual electrical control signals the first time interval and the second time interval can be determined individually on the basis of the parameterization commands.

8. The fluid assembly according to claim 6, wherein the processing unit is designed in such a way that for each of the individual electrical control signals a first control signal level can be selected from the first level interval and/or a second control signal level can be selected from the second level interval on the basis of the parameterization commands.

9. The fluid assembly according to claim 1, wherein the input interface is designed to receive control commands coded digitally as bus telegrams and/or to receive analog control commands coded by a current level or a voltage level.

10. The fluid assembly according to claim 1, wherein the control module and the power unit are arranged on a common printed circuit board, the printed circuit board being arranged in a housing to which a holder is fixed on which a plurality of solenoid valves electrically connected to the output interface are arranged along a row axis.

* * * * *